Oct. 6, 1942.                D. K. McGEHEE                2,297,788
                              POWER LIFT
                          Filed Dec. 6, 1940              2 Sheets-Sheet 2
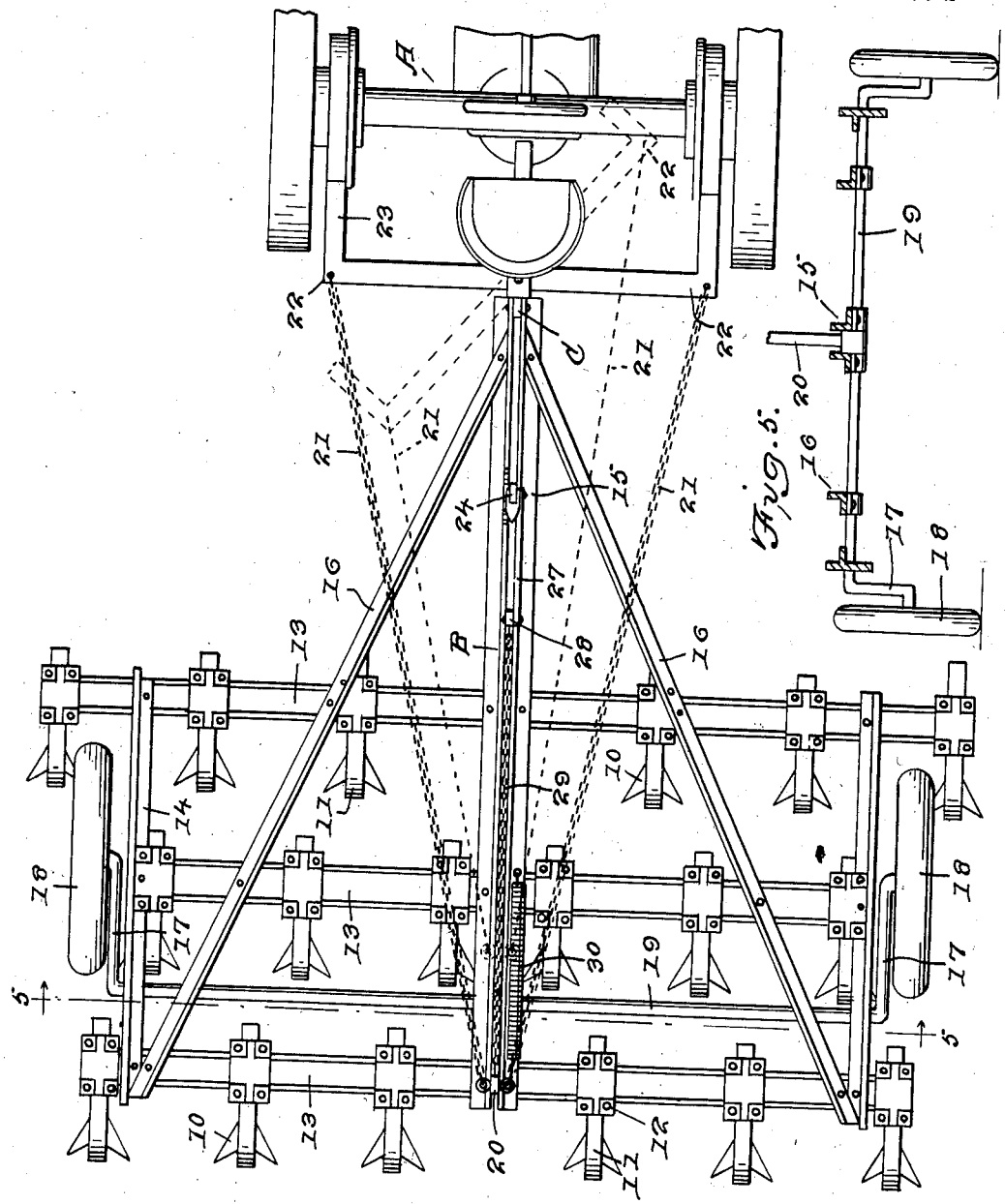
INVENTOR
D. K. McGehee
BY
ATTORNEY Patented Oct. 6, 1942

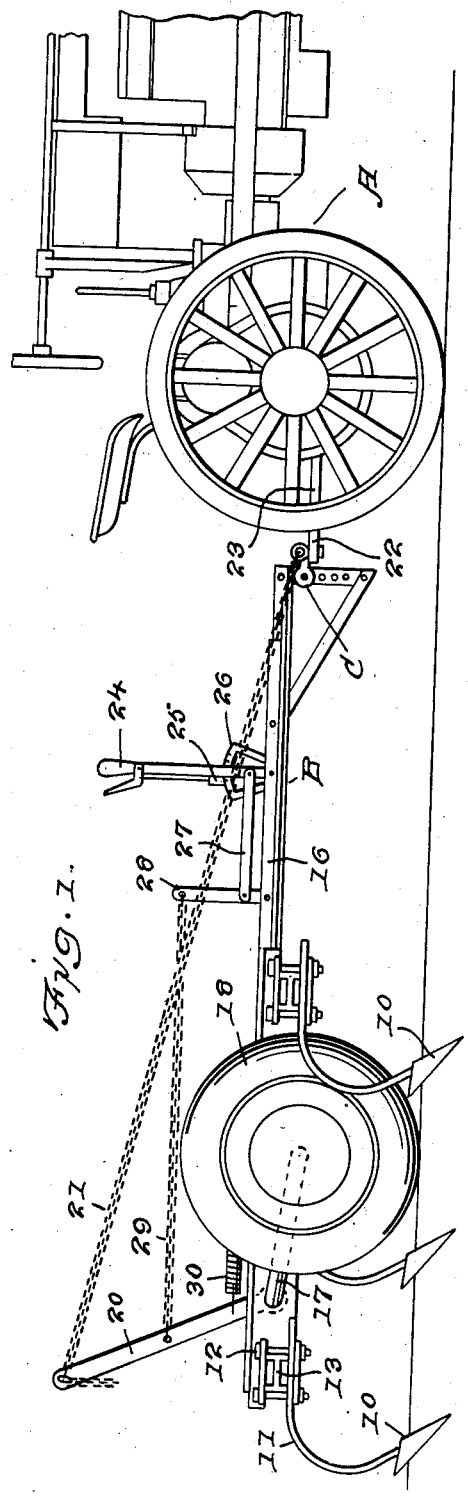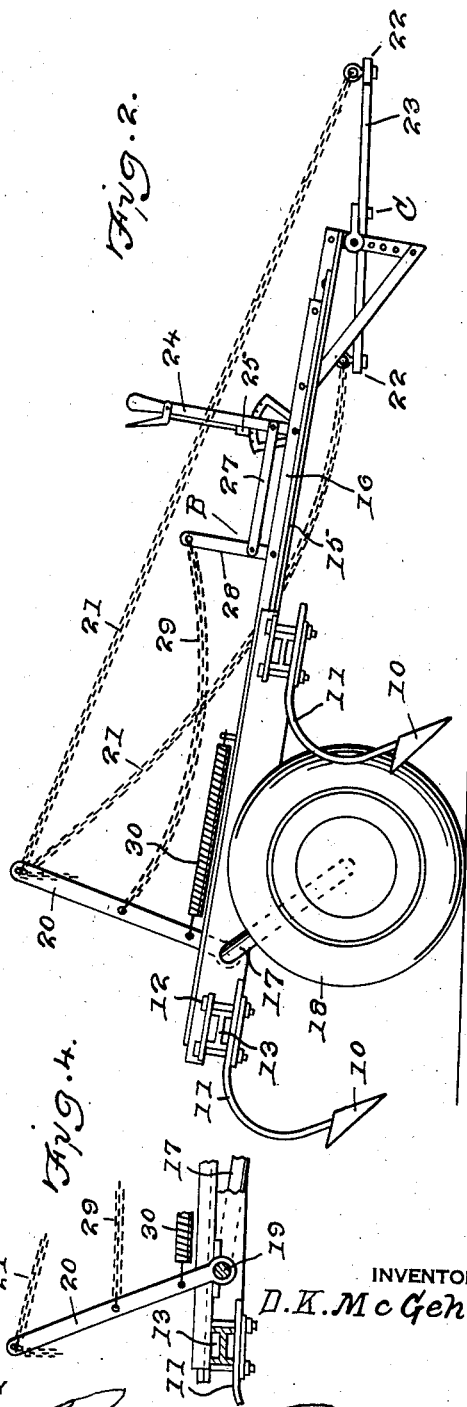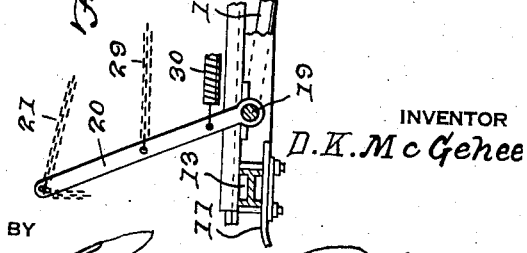

2,297,788

UNITED STATES PATENT OFFICE 2,297,788

POWER LIFT

David K. McGehee, Wayside, Tex.

Application December 6, 1940, Serial No. 368,945

1 Claim. (Cl. 97—75)

The invention relates to a power lift, and more especially to an automatic lift for use with farming machinery, for example, gang plows hitched to tractors.

The primary object of the invention is the provision of a lift of this character, wherein the same has direct association only with the frame of a draft farming implement of the gang type, and in no manner is directly connected with the ground working tools of such implement, which are rigid on the frame thereof and are susceptible of a wide range of adjustment on the frame, the latter being elongated transversely to the line of draft of the implement for this purpose, and no tool of the latter has connection with the lift, thus enabling the desired positioning of such tools in accordance with the requirements of the work to be performed by the implement.

A further object of the invention is the provision of a lift of this character, wherein the construction thereof is novel, being automatic in the working of the same, and capable of manual adjustment.

A still further object of the invention is the provision of a lift of this character, which is simple in construction, thoroughly reliable and efficient in operation, strong, durable, easily applied and removed, adaptable to varying types of farm implements, and inexpensive to manufacture and install.

With these and other objects in view the invention consists in the features of construction, combination and arrangement of parts as will be hereinafter more fully described in detail, illustrated in the accompanying drawings which disclose the preferred embodiment of the invention, and pointed out in the claim hereunto appended.

In the accompanying drawings:

Figure 1 is a side elevation of the lift constructed in accordance with the invention applied to a tractor.

Figure 2 is a fragmentary side view showing the lift in adjusted position.

Figure 3 is a top plan view.

Figure 4 is a fragmentary detail longitudinal sectional view through the lift.

Figure 5 is a sectional view taken on the line 5—5 of Figure 3.

Similar reference characters indicate corresponding parts throughout the several views in the drawings.

Referring to the drawings in detail, A designates generally a portion of a tractor, while B denotes the power lift. The tractor A is of standard construction and constitutes the draft medium for the power lift B, being detachably joined by a hitch C.

The power lift B has included therewith a gang plow having separated rows of plow shares 10, these being supported from standards 11 which are separably and adjustably fastened in place at 12 to horizontal beams 13 transversely of and making up a frame 14. This frame 14 has forwardly directed braces angled to and joined with a longitudinally disposed center draft rigging 15, the braces being indicated at 16. The rigging and braces are made secure to the frame 14, and this rigging 15 is connected by the hitch C to the tractor A for the advancement of the gang plow.

The frame 14 has fitted therewith a cranked axle 17 on which is journalled ground wheels 18, the crank 19 of said axle 17 being turnable in a vertical direction, so that the frame will be raised and lowered and correspondingly the gang plow.

Interfitting the rigging 15 and fixed to the crank 19 of the axle 17 is an upstanding turning arm 20 which has adjustably connected thereto at its uppermost end forwardly divergent chains 21, these being anchored to the rear opposite corners 22 of the chassis frame 23 of the tractor A, so that when the latter turns to the right or left one of the chains becomes taut and the other slackens, thus resulting in the lifting of the gang plow during the making of the turn by said tractor. This drawing of the chain taut effects the turning of the crank 19 of the axle 17 and thus lifting the gang plow to remove the plows 10 from the ground. When the tractor has completed the turn the gang plow will lower to ground working position for the working of the ground during the travel of the tractor in a straight path.

Attached to the rigging 15 forwardly thereof is an adjusting lever 24 having a hand released latch 25 coacting with a keeper segment 26 rigid upon said rigging 15. This lever 24 through linkage 27 operates a raising and lower swingable arm 28, it having chain connection 29 with the arm 20, so that the gang plow can be regulated for depth plowing.

The arm 20 has connected thereto a tensioning spring 30 which also has connection with the rigging 15, and this spring aids in the lifting operation for the raising of the gang plow.

Other ground working implements can be substituted for the gang plow in the use of the lifting device constituting the present invention.

The hitch C in its kind permits of the vertical adjustment of the forward end of the rigging 15 as will be apparent.

The spring 30 is a device for urging the wheels 18 to ground engaging position.

It is to be understood that changes, variations and modifications may be made in the invention without departing from the spirit thereof and as properly fall within the scope of the claim hereunto appended.

What is claimed is:

In a power lift, the combination of a draft farming implement having a frame elongated transversely to the line of draft thereof, ground traversing means swingingly connected to the frame for raising and lowering the same, a universal connection between the frame and a draft medium for the implement, ground working means rigid on and adjustably connected directly to the frame, the ground traversing means being disposed to be out of range of the adjustment of the ground working means for avoiding interference therebetween, a turning member on the ground traversing means and located approximately at the center of the line of draft of the frame for the swinging of said traversing means, adjustable means on the frame forwardly of the turning member and flexibly connected to the latter for setting the throw thereof in one direction, a retractile spring between the adjustable means and the member and having connection with the latter and the frame, and flexible connections between the draft medium and said turning member and divergently arranged in the direction of the draft member.

DAVID K. McGEHEE.